Patented Dec. 20, 1932

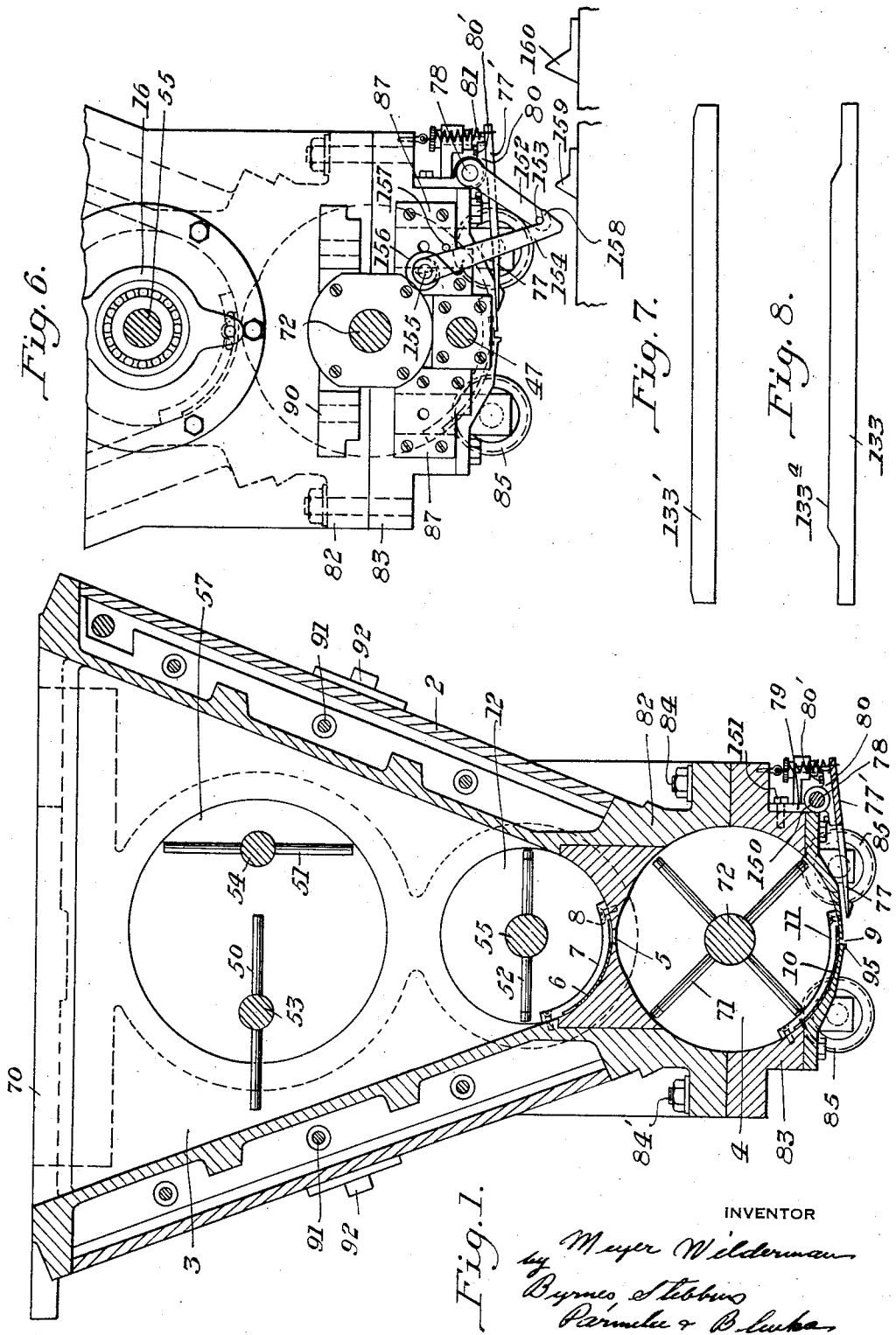

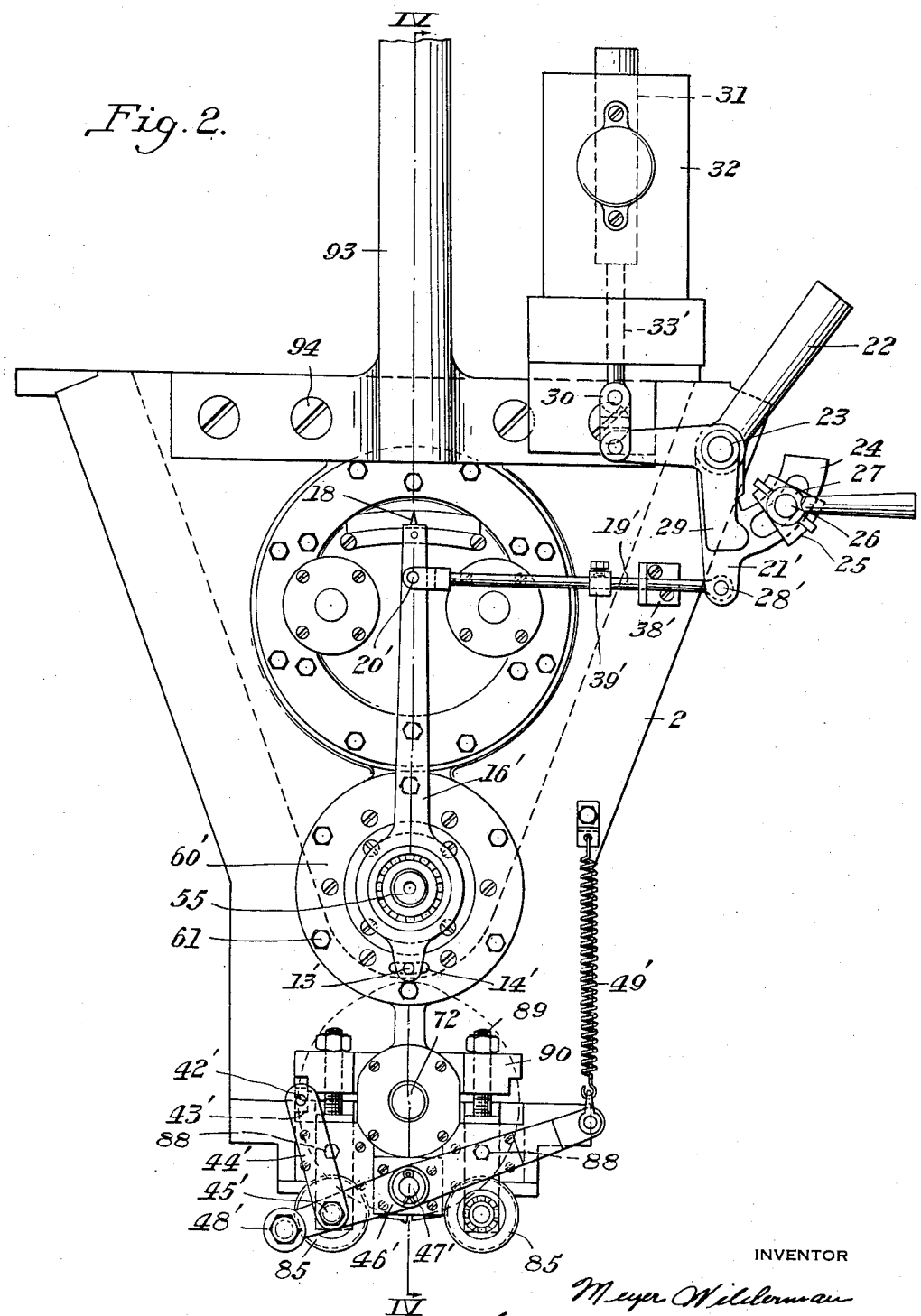

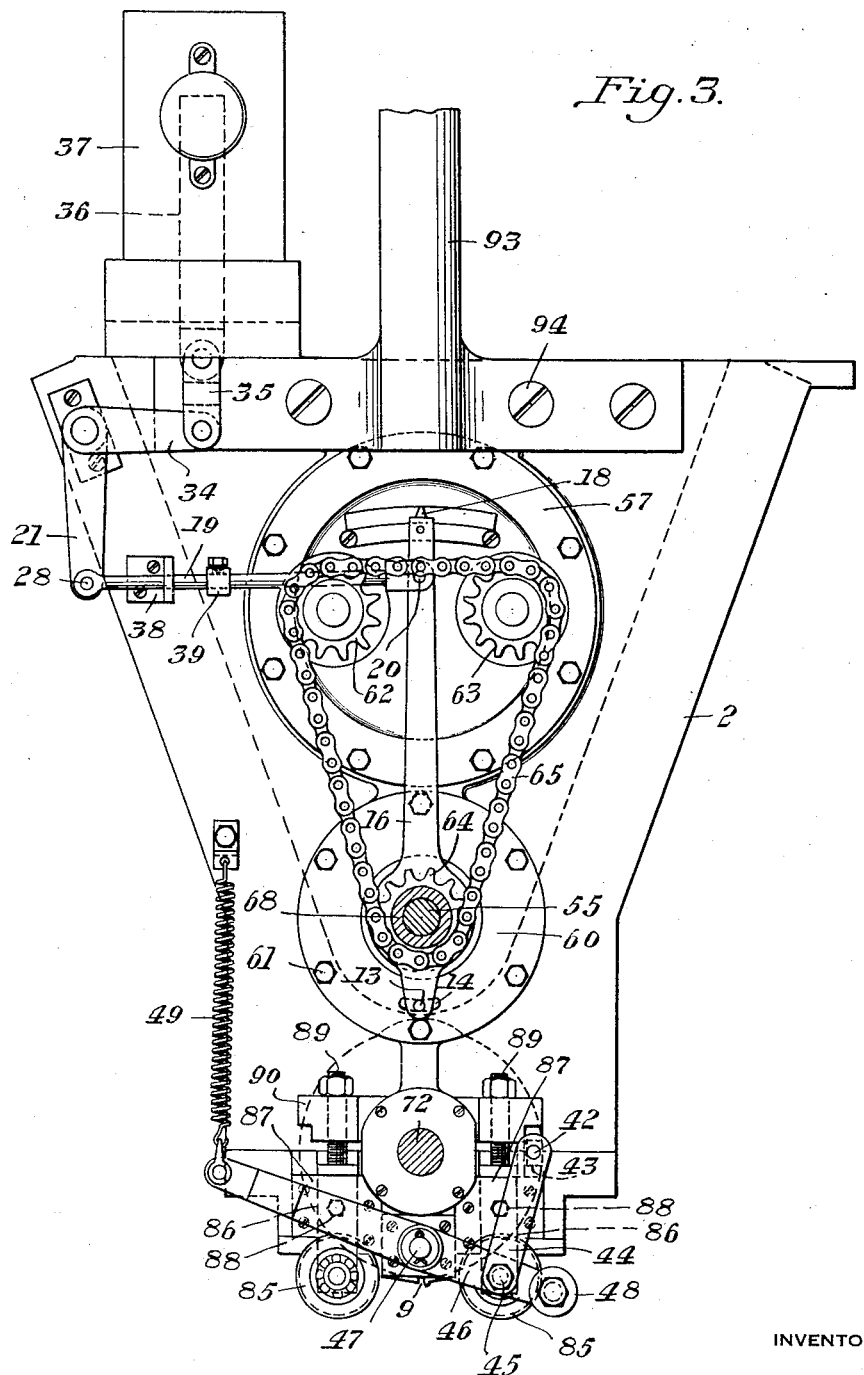

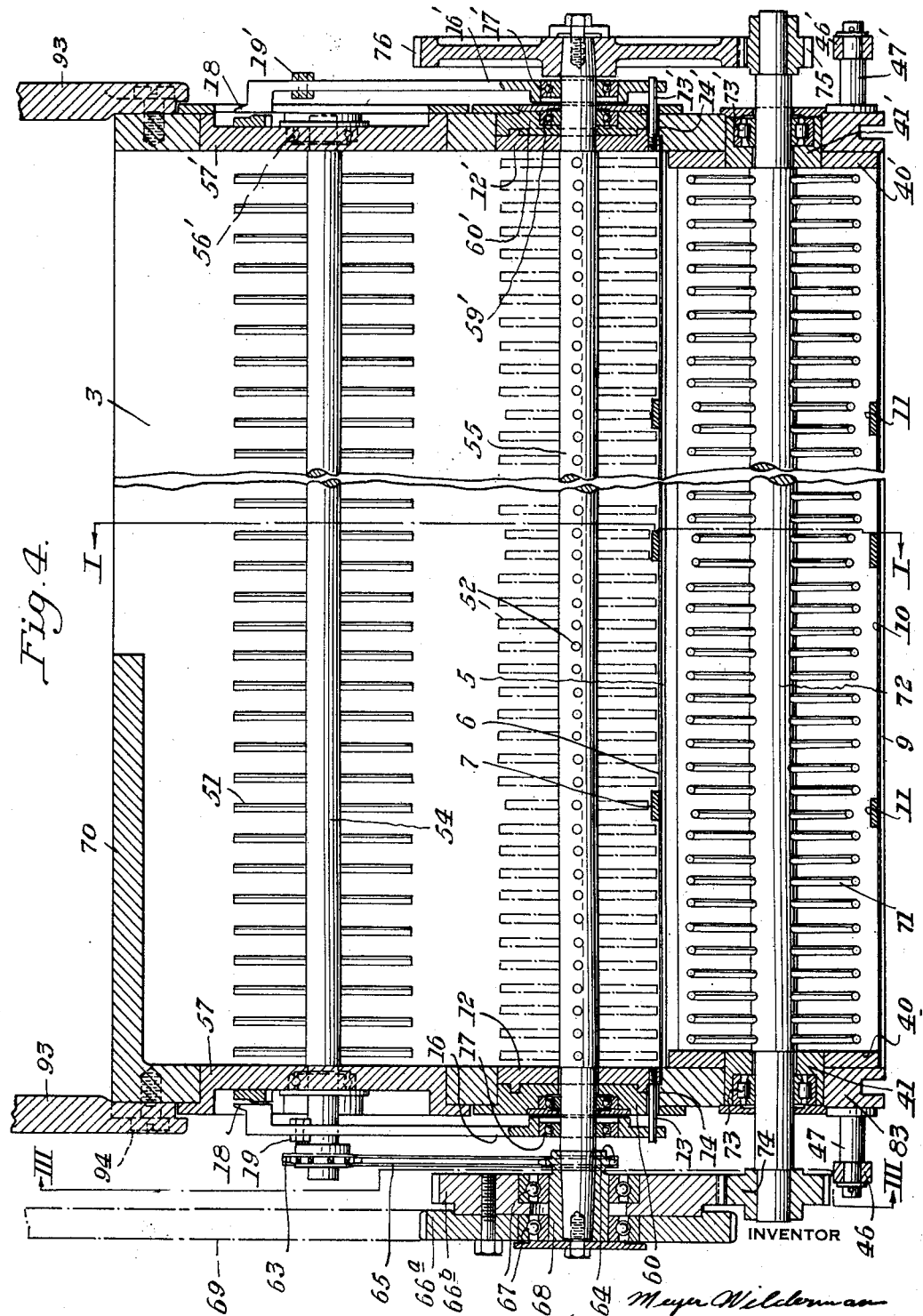

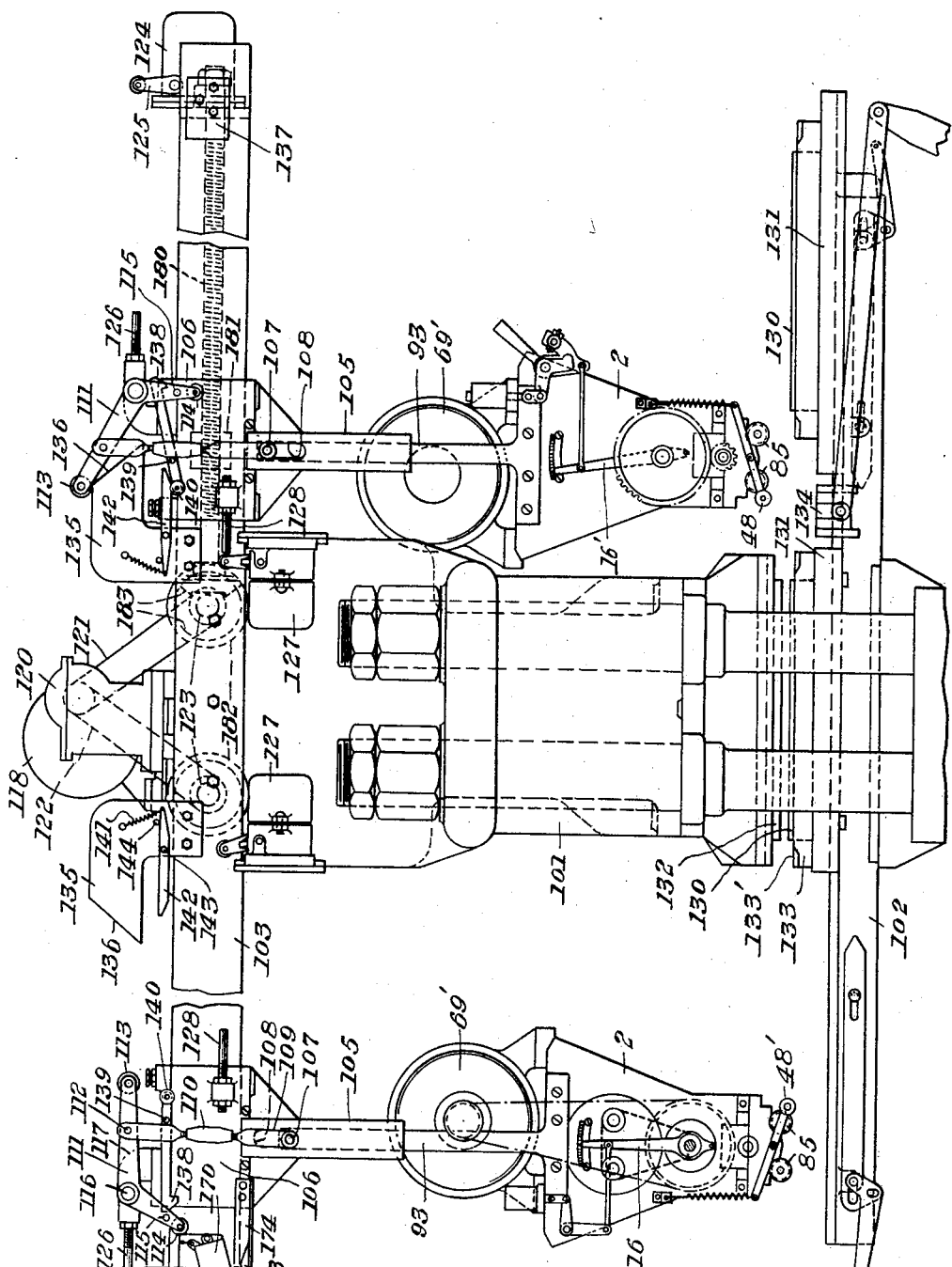

1,891,790

UNITED STATES PATENT OFFICE

MEYER WILDERMAN, OF MONTE CARLO, MONACO, ASSIGNOR TO THE AMERICAN WILDERMAN POROUS EBONITE COMPANY, OF PHILADELPHIA, PENNSYLVANIA, A CORPORATION OF PENNSYLVANIA

SPREADING APPARATUS

Application filed January 8, 1931, Serial No. 507,352, and in Great Britain December 20, 1928.

This invention relates to a device for spreading finely divided solid material uniformly in a mold. It may be used for the preparation of solid or porous articles by the method hereinafter disclosed.

This application is a continuation-in-part of my copending application Serial No. 334,447, filed January 23, 1929.

In the manufacture of articles such as separators for storage batteries, diaphragms, filter plates, etc., of porous or porous and non-porous material, it is essential that the porosity be uniform throughout the article and also that similar articles made at different times have the same porosity. It is also desirable to be able to make articles whose porosity is different from that of other similar articles and this is most easily accomplished by varying the amount of granulated material placed in a given volume, and then pressing the material.

In order to manufacture such articles under strictly controlled and duplicable conditions, I have invented the machine herein described which I call a spreader.

It is particularly adapted for spreading powdered semi-vulcanized rubber mixtures and the like into a rigid mold or onto a sheet of metal foil contained in a rigid mold for the production of porous rubber articles, such as are described in my United States Patent No. 1,651,567, granted December 6, 1927, and for the process described in my copending application Serial No. 334,447, filed January 23, 1929.

In one embodiment of the invention, the spreader has two chambers, an upper one which I designate as the hopper or storage chamber, and a lower cylindrical one. The two chambers are connected by a slot at the lowest part of the hopper and extending the entire length parallel to the axis of the cylindrical chamber. This slot is controlled by a shutter by means of which it can be closed or opened as occasion demands and by means of which the flow of material from the hopper to the lower chamber may be regulated.

The cylindrical chamber is also provided with a slot and a shutter at its lowest part and through this slot the material flows to the mold when the shutter is opened.

The hopper is further provided with stirrers which keep the powder contained therein in a state of fine subdivision as is necessary for good spreading and the lower cylinder also has a stirrer for the same purpose. This second stirrer insures uniform delivery of the material through the lower slot and into the mold.

Means for heating the powder within both chambers is also provided in the walls of the spreader. The heating of the powder keeps it in a state of fine subdivision and is preferably done electrically since, by means of automatic regulators, the temperature can be accurately controlled.

On the bottom of the spreader movable blades or fingers are fastened which press the metal foil firmly into the mold during the spreading operation, so as to insure uniform thickness of the powdered material in the mold.

The shutter for the lower slot is operated by a series of levers which are actuated through a roller on one of the levers, running on a cam type rail.

In the accompanying drawings which illustrate one embodiment of the invention,

Figure 1 is a transverse section of the spreader on line I—I of Figure 4;

Figures 2 and 3 are opposite end views, parts being omitted for clearness;

Figure 4 is a longitudinal section on line IV—IV of Figure 2;

Figure 5 is a side view of the press, spreader and mold assembly;

Figure 6 is a detail illustrating the operation of the fingers or blades which press the metal foil into the molds;

Figure 7 illustrates one of the rails on which the spreader is supported; and

Figure 8 illustrates one of the cam rails for controlling the spreading of powdered material into the molds.

Referring more particularly to the accompanying drawings, the spreader 2 comprises an upper chamber 3 in the general form of a hopper, and a lower cylindrical chamber 4. The upper and lower chambers communicate through a slot 5 which is controlled by a shutter 6. Straps 7 hold the shutter tight against the wall of the spreader and hence insure positive closing of the slot. These straps are fastened to the body of the spreader by screws 8.

The cylindrical chamber 4 is provided at its bottom with a distributing slot 9 controlled by a shutter 10. The shutter is held tight against the wall of the chamber by straps 11.

The shutter 6 between the two chambers is fastened at each end to discs 12 and 12′ and these discs have projecting pins 13 and 13′ which extend through slots 14 and 14′ in the end walls of the upper chamber. The discs rotate about the shaft 55 of the stirrer.

The pins 13 and 13′ are connected at their outer ends to the levers 16 and 16′ which are mounted on ball bearings 17 and 17′ on the ends of the shaft 55. At the upper end of each lever is a pointer 18 to indicate the position of the shutter within the spreader. Rods 19 and 19′ are connected to the levers 16 and 16′ by pins 20 and 20′ and the other ends of these rods are connected to levers 21 and 21′ by the pins 28 and 28′. The lever 21′ is integral with a handle 22 which is used for manual operation of the shutter 6. The levers 21 and 21′ are rigidly connected to a shaft 23 to insure simultaneous action at both ends of the shutter. The lever 21′ has a slotted extension part 24 which carries a stop lug 25 fastened by the bolt 26 and nut 27 to the slotted portion 24. Mounted loosely on the shaft 23 at the end where the handle and stop lug are, is a bell crank 29. The upper arm of this crank is connected by a link 30 and rod 33 to the armature 31 of an electromagnet 32. On the other end of the shaft 23 a crank 34 is rigidly mounted. This crank is connected through a link 35 to the armature 36 of an electromagnet 37. These magnets are operated automatically so as to open and close the intermediate shutter 6 as the spreading operation requires. The rods 19 and 19′ pass through holes in the stops 38 and 38′ which are fastened to the body of the spreader. These rods also carry adjustable lugs 39 and 39′ which stop the shutter at any desired point by contacting with the stops 38 and 38′.

The shutter 6 is operated as follows:—

When the spreading operation starts the magnet 32 is automatically energized for a few seconds. The armature 31 is drawn downwardly from the position shown in Figure 2 and this rotates the crank 29 counterclockwise and moves the stop 25 on the crank arm 24. This rotates the shaft 23 which operates the crank 21 and 21′ which move the levers 16 and 16′ by means of the rods 19 and 19′, thus opening the shutter. When spreading is finished, the magnet 37 is momentarily energized to move the armature 36 upwardly from the position shown in Figure 3, thus reversing the above operations and closing the shutter.

The magnet 37 is controlled by a switch 170 (Fig. 5) having an arm 171 provided with a roller 172. At the end of the spreading operation, hereinafter more fully described, the roller 172 is contacted by a cam 173 on a bracket 174 secured to a carrier 106, and in this manner the magnet is momentarily energized.

The lower shutter 10 is operated mechanically by means of a series of levers. The ends of this shutter are mounted on discs 40 and 40′ which rotate freely on the housing of the roller bearings 41 and 41′. To each of these discs a pin 42 or 42′ is fastened, these pins extending through slots 43 or 43′ in the body of the spreader.

These pins pass through holes in the levers 44 and 44′, the lower ends of which are pivoted at 45 and 45′ on the levers 46 and 46′. These levers are loosely mounted on shafts 47 and 47′ which are fastened on the body of the spreader. At the lower ends of these levers, rollers 48 and 48′ are mounted. These rollers run on cam type rails 133 (Figs. 5 and 8) as the spreader operates and by raising the lower ends of the levers 46 and 46′ open the shutter 10 by rotating the discs 40 and 40′ by means of the pins 42 and 42′. The other ends of these levers are connected by springs 49 and 49′ to the body of the spreader, these springs closing the shutter when the rollers 48 and 48′ come to the proper place on the cam rail.

The upper chamber or hopper 3 is equipped with three stirrers 50, 51 and 52 which are mounted on shafts 53, 54 and 55. The shafts 53 and 54 run in ball bearings 56 and 56′ which are mounted in end plates 57 and 57′.

The lower stirrer 52 is also mounted in ball bearings 59 and 59′ which are set in the end plates 60 and 60′ fastened to the ends of the spreader by means of bolts 61.

One end of each of these three shafts 53, 54 and 55 carries a sprocket 62, 63 and 64 on which runs a chain 65.

On the same end of the shaft 55 there is mounted a double gear 66a and 66b (Fig. 4). Between this double gear and the shaft is a double ball bearing 67 mounted on a sleeve 68 on the shaft 55. On this sleeve the sprocket 64 is mounted. By assembling the gears in this way, it is possible to rotate the gears without rotating the three stirrers in the hopper when the lower part 83 is disconnected from the upper part of the spreader.

The gear 66a is connected by a driving chain 69 to an electric motor 69′ mounted on the top plate 70 of the spreader.

In the lower chamber 4 there is a stirrer 71 extending the entire length of the chamber and mounted on the shaft 72. The ends of this shaft extend through the end walls of the lower chamber and are carried in roller bearings 73 and 73'. These roller bearings are not fastened to the end walls, but fit loosely in slots so that the lower half of the lower chamber can be removed for cleaning as will be hereinafter disclosed.

The shaft 72 is equipped at its ends with gears 74 and 75. The gear 74 meshes with the gear 66b which is driven through the gear 66a by the motor 69'. In this way, the shaft 72 revolves and the gear 75 which is in mesh with gear 76 fastened to the shaft 55 causes the latter, and hence the three stirrers in the upper chamber, to rotate since these three stirrers are all connected by the sprockets 62, 63 and 64 and the chain 65.

When spreading material into metal foil molds, the spreaders are provided with plates or fingers 77 which press the metal foil into the grooves in the rigid mold during the spreading of the powdered material in the mold. These fingers and the associated operating mechanism are shown in detail in Figure 6. The fingers are formed in plates 77', a finger being provided for each groove in the mold. There are as many plates 77' as there are rows of separators in the mold. Each of the plates 77' has a bearing or strap 80 secured thereto by screws 80', the circular portion 150 of the strap being rigidly connected to a shaft 78 which is supported in bearings 79 secured to the lower part 83 of the spreader by screws 151. The right-hand end of each plate 77', as viewed in Figure 6, is normally pulled upwardly by a spring 81 fastened at its upper end to the spreader. The tendency of the spring is to lower the fingers 77 into contact with the metal foil in the mold. The shaft 78 has an arm 152 rigidly secured thereto, and the lower end of the arm is provided with a pin 153 which cooperates with an arm 154 to hold the fingers out of contact with the metal foil as the spreader is being returned to starting position. The arm 154 is pivoted at its upper end on a pin 155 and is provided with a spring 156 which tends to force the arm to the right, as viewed in Figure 6. The movement of the arm is limited by a stop pin 157.

Before starting to press the metal foil into the rigid molds and spreading the powdered material on top of the foil, the fingers 77 are in the position indicated in Figure 6. As the spreader is moved to the right, the catch 158 on the arm 154 contacts with a cam 159 on the table which releases the catch from the pin 153. This allows the spring 81 to draw the right-hand end of the plate 77' upwardly and, accordingly, depresses the fingers 77 so that they will press the foil in the grooves of the mold. When the spreader reaches the right-hand end of the mold, the arm 152 contacts with the cam 160, thereby rotating the arm 152 upwardly and raising the fingers 77 from the mold. The spring 156 brings the hook 158 into engagement with the pin 153 in order to hold the fingers in their raised position. The spreader is then moved to the left to its starting position, while the fingers are held out of contact with the mold or the material therein.

The body of the lower chamber is made up of two parts, the upper part 82 of which is integral with the main body of the spreader, whereas the lower part 83 is removable. This part is held in place by the bolts 84 and 84'.

In the ends of this removable piece are slots which carry the roller bearings 73 and 73' and their housings 41 and 41'. The upper halves of the ends of the chamber are correspondingly slotted to receive the upper portion of these housings when the spreader is assembled.

Each end of this lower removable piece 83 has two rollers 85 mounted on ball bearings which are, in turn, mounted on a sliding piece 86 (Fig. 3) which can move up and down in a slot in the guide 87 which is screwed to the end of the chamber. These sliding pieces may be held in any desired position by the set screws 88. Directly above these sliding pieces are adjusting screws 89 which are screwed into blocks 90 fastened to the ends of the spreader.

The object of these screws is to adjust the distance of the spreading slot 9 from the surface of the molds. The rollers 85 run on rails 133' whose position relative to the mold does not change and hence the whole spreader may be raised or lowered by the adjusting screws 89 acting on the sliding pieces 86 which carry the rollers.

In order to spread some powders properly, they must be maintained at an elevated temperature. For this purpose, heating elements 91 are enclosed in the double wall of the spreader and the temperature is controlled by connecting one or more of these elements to a source of electric current by means of a multiple point switch 92.

The spreader is suspended from an overhead frame 103 (Fig. 5) by suspension bars 93 which are fastened to the spreader by screws 94. In order to spread the material in the mold, the spreader moves over the latter and, to prevent dragging the powder in the mold, a thin projecting metal strip 95 (Fig. 1) is arranged at the slot 9. This acts as a gauge and keeps the depth of the powder layer in the mold constant.

This spreader may be used in different ways. It may, for instance, be mounted on a press which will compress the powder in the mold subsequent to spreading. In this case, the spreader moves over a stationary mold. The spreader may also be held stationary while the molds are passed under it on a suitable conveyor. In any case, the principles of the spreader are the same and the former method will be described, by way of example.

When used in conjunction with a press, the spreader may be conveniently arranged as shown in Figure 5.

The operating mechanism of the press is not shown since it is immaterial how the press operates. It is preferred, however, to use a continuously acting press having a table on which the molds slide and on which they can be drawn into the press for compression. This is the type described herein.

Referring to Figure 5, the press comprises a headpiece 101 and a table 102 on which the molds move.

On the head piece a frame 103 is mounted which carries the spreaders 2, which are suspended by suspension bars 93. These suspension bars move in the guides 105, which are fastened to carriers 106 which slide on the frame 103.

Near the upper ends of the bars 93 are wrist pins 107 which pass through slots 108 in the guides 105. These pins are connected to the lifting bars 109 carrying the adjusting turnbuckles 110 and are attached to bell cranks 111 by means of bolts 112.

The upper arms of the bell cranks carry rollers 113 and the lower arms have rollers 114 and also pins 115. The bell cranks are pivoted on the shafts 116 which are mounted on projecting portions 117 of the carriers.

When in operation, the spreaders move back and forth on the frame 103 and are driven by screws 180 passing through traveling nuts 181 fastened to the carriers 106. These screws are driven by a motor 118 mounted on the head piece of the press through reduction gear 120 and chains 121 and 122 which drive the cross shafts 123. On these shafts are mounted magnetic clutches 182 and by a suitable arrangement of switches, the carriers may be moved in either direction, the cross shaft driving the screws by means of bevel gears 183.

At the ends of the frame 103 are switches 124 with levers 125. These levers are operated by rods 126 which are mounted on the carriers 106 and are for the purpose of releasing the magnetic clutch 182 thus stopping the forward motion of the spreader. The switches 127 and rods 128 operate in the same way and are for stopping the backward motion of the spreader.

The lower halves of molds 130 in which the powder is to be spread are fastened to a sliding table 131 which slides on a steam heated table 102. The upper half 132 of the mold is fastened to the steam heated head piece 101 of the press. The rollers 83 of the spreader run on the rails 133′, and the rollers 48, which through the shutter 10 control the slot 9, run on the rails 133. The molds are drawn in and out of the press by suitable mechanism (not shown) which operates a draw bar 134 connected to table 131.

The spreader operates as follows:

The starting position is near the head piece 101 of the press, as shown by the right-hand spreader 2 as viewed in Figure 5. In this position, the spreader is at the highest level and is held up by the rollers 113 on the bell crank 111 which rest on the top surface of the cam plate 135. The spreader is started forward by causing the screws to rotate in the traveling nuts 181. The rollers 113 then move down the surface 136 of the cam plate 135 until the rollers 85 rest on the rails 133′. When the slot 9 of the spreader is over the nearest edge of the mold cavity, the rollers 48 run on to the raised portion 133a of the cam rail 133 and thus open the spreading slot by operating the levers 44 and 46. The machine then moves forward until the last edge of the mold cavity is reached, when the rollers 48 run off the raised portion of the cam rail and close the shutter. The spreader continues its forward motion until the rollers 114 on the bell crank 111 engage the stop plates 137 fastened to the frame 103. Thus, the forward motion causes the bell crank to rotate about its pivot 116 and lift the spreader by means of the lifting bars 109. A little further movement of the spreader causes the rod 126 to operate the switch 124 by moving the lever 125 and this releases the magnetic clutch on the drive shaft 123, causing the spreader to stop. At the same time, the hooks 138 drop over the pin 115. This hook is pivoted at 139 and has a roller 140 on the other end. The pivot 139 is fastened to the carrier 106. By a remote electrical control, the reverse clutch is now operated and the spreader moves backward preferably at a rate faster than that of the forward motion. The hooks 138 prevent the bell crank 111 from rotating and thus hold the spreader in its elevated position. As the spreader approaches the head piece of the press, the rollers 113 run on to the surface 136 of the cam plate 135, thus raising it slightly. This releases the pressure of the hooks 138 on the pins 115 and they are moved upwards from the pins by the spring 141 acting through the lever 142, pivoted at 143, on the rollers 140 of the hook. The lever 142 is held in its proper position when not in contact with the roller 140 by a pin 144.

At the moment when the rollers 113 reach the top surface of the cam plate 135, the rod 128 operates the switch 127, releasing the magnetic clutch on the shaft 123 and thus stopping the backward motion of the spreader.

If foil molds are employed, a foil holding combining strips is placed in the lower half 130 of the mold and the powdered material spread in the mold, as above described. An upper foil is then placed upon the powdered material and the lower half 130 of the mold containing the spread powdered material and the upper and lower foils is then moved under the press 101. In the press, the upper half 132 of the mold compresses the powdered material and unites the upper and lower foils. The lower half 130 of the mold containing the compressed article encased by the upper and lower united foils is then withdrawn from the press and the article and foils are removed as a unit and are vulcanized.

When using foil molds, if desired, the upper foil and the upper half 132 of the mold may be placed on the lower half 131 of the mold containing a lower foil and the material spread therein, and both the upper and lower halves of the mold and the upper and lower foils with the powdered material therebetween may be moved under the press and compressed.

Where metal foils are not employed, the powdered material is spread into the lower half 130 of the mold and the top half 132 is placed thereon. The whole mold including the top and bottom halves is then moved under the press and compressed. Thereafter, the whole mold is removed from the press and the compressed article is removed from the mold or the mold containing the article is removed bodily and the operation is repeated.

I have illustrated and described the present preferred embodiment of the invention. The invention may be otherwise embodied within the scope of the following claims:

I claim:

1. Apparatus for spreading finely divided solid material into a mold, comprising a container, means for moving the mold and container relative to each other, a stirrer in the container, the container being provided with a distributing slot, a shutter controlling the slot, and means operable in accordance with the relative position of the container and mold for actuating the shutter.

2. Apparatus for spreading finely divided solid material into a mold, comprising a container, means for moving the mold and container relative to each other, means for heating the container, a stirrer in the container, the container being provided with a distributing slot, a shutter controlling the slot, and means operable in accordance with the relative position of the container and mold for actuating the shutter.

3. Apparatus for spreading finely divided solid material into a mold, comprising a container, means for moving the mold and container relative to each other, a stirrer in the container, the container being provided with a distributing slot, a shutter controlling the slot, a cam roller carried by the container, operative connections between the cam roller and shutter, and a cam for operating the cam roller in accordance with the relative position of the container and mold.

4. Apparatus for spreading finely divided solid material into a mold, comprising a container, means for moving the mold and container relative to each other, a stirrer in the container, the container being provided with a distributing slot, a shutter controlling the slot, the shutter being connected to a rotatable member, a cam roller connected through a link to said rotatable member, and a cam for operating the roller in accordance with the relative position of the container and mold.

5. Apparatus for spreading finely divided solid material into a mold, comprising a container, means for moving the mold and container relative to each other, means for heating the container, a stirrer in the container, the container being provided with a distributing slot, a shutter controlling the slot, the shutter being connected to a disc rotatable on the stirrer shaft, a lever pivotally mounted on the container, a cam roller on the lever, connections between the lever and disc, and a cam for operating the cam roller.

6. Apparatus for spreading finely divided solid material into a mold, comprising a container, means for moving the mold and container relative to each other, means for heating the container, a stirrer in the container, the container being provided with a distributing slot, a shutter controlling the slot, said stirrer being mounted on a stirrer shaft extending beyond the container at each end thereof, a rotatable disc mounted on each end of the stirrer shaft, the shutter being connected to said discs, a lever pivotally mounted on each end of the container, a cam roller on one end of each lever, links connecting the discs and levers, a cam rail, and means for holding the rollers in contact with the rail.

7. Apparatus for spreading finely divided solid material into a mold, comprising a container, means for moving the mold and container relative to each other, means for heating the container, the container being divided into an upper and lower chamber having a communicating upper slot therebetween, a stirrer in each chamber, a lower distributing slot in the lower chamber, an upper and a lower shutter controlling said slots, means for regulating the position of the upper shutter, and means operable in acordance with the relative position of the container and mold for actuating the lower shutter.

8. Apparatus for spreading finely divided solid material into a mold, comprising a container, means for moving the mold and container relative to each other, means for heating the container, the container being divided into an upper and lower chamber having a communicating upper slot therebetween, a stirrer in each chamber, a lower distributing slot in the lower chamber, an upper and a lower shutter controlling said slots, discs rotatably mounted on the ends of a stirrer shaft and connected to the upper shutter, other discs rotatably mounted on the ends of another stirrer shaft and connected to the lower shutter, means for regulating the position of the upper shutter, and means operable in accordance with the relative position of the container and mold for actuating the lower shutter.

9. Apparatus for spreading finely divided solid material into a mold, comprising a container, means for moving the mold and container relative to each other, means for heating the container, the container being divided into an upper and lower chamber having a communicating upper slot therebetween, the lower chamber being cylindrical, the lower chamber being provided with a stirrer and a lower distributing slot, a shutter for controlling said lower slot, and means operable in accordance with the relative position of the container and mold for actuating the shutter, the walls defining the lower cylindrical chamber being divided so that the lower portion can be removed for cleaning the stirrer.

10. Apparatus for spreading finely divided solid material into a mold, comprising rails, a container having supporting rollers running on the rails, an overhead guiding and supporting framework, the container being supported from the framework by lifting bars connected to carriers movable on the framework, means for moving the container while supported on the rails during the spreading operation, means for raising the spreader from the rails at the completion of the spreading operation, means for returning the spreader to its starting position while raised from the rails and supported on the framework, and means for lowering the spreader onto the rails.

11. In apparatus for spreading finely divided solid material into molds, rails, a container having supporting rollers running on the rails during the spreading operation, an overhead guiding and supporting framework, carriers movable on the framework, bell crank levers mounted on the carriers, lifting bars connecting the container and bell crank levers, and means for rotating said levers at the end of a spreading operation to raise the spreader from the rails.

12. In apparatus for spreading finely divided solid material into molds, rails, a container having supporting rollers running on the rails during the spreading operation, an overhead guiding and supporting framework, carriers movable on the framework, bell crank levers mounted on the carriers, lifting bars connecting the container and bell crank levers, means for rotating said levers at the end of a spreading operation to raise the spreader from the rails, means for returning the spreader to starting position while raised from the rails, and means for lowering the spreader onto the rails.

13. In apparatus for spreading finely divided solid material into molds, rails, a container having supporting rollers running on the rails during the spreading operation, an overhead guiding and supporting framework, carriers movable on the framework, bell crank levers mounted on the carriers, lifting bars connecting the container and bell crank levers, a cam on the framework for rotating said levers to raise the spreader at the end of a spreading operation, a catch lever for retaining the spreader in raised position while it is returned to starting position, and means on the framework adjacent the starting position of the container for releasing said catch lever whereby the spreader may be lowered onto the rails.

14. In apparatus for spreading finely divided solid material into molds, rails, a container having supporting rollers running on the rails during the spreading operation, an overhead guiding and supporting framework, carriers movable on the framework, a screw threaded into at least one of the carriers, means for rotating the screw to move the carriers along the framework, bell crank levers mounted on the carries, lifting bars connecting the container and bell crank levers, and means for rotating said levers at the end of a spreading operation to raise the spreader from the rails.

15. In apparatus for spreading finely divided solid material into molds, rails, a container having supporting rollers running on the rails during the spreading operation, an overhead guiding and supporting framework, carriers movable on the framework, a screw threaded into each carrier, means for rotating the screws to move the carriers along the framework, bell crank levers mounted on the carriers, lifting bars connecting the container and bell crank levers, a cam on the framework for rotating said levers to raise the spreader at the end of a spreading operation, a catch lever for retaining the container in raised position while it is returned to starting position, a second cam on the framework adjacent the starting position of the container, said second cam being operative to release the pressure on the catch lever, and means for releasing the catch lever whereby the container may be lowered onto the rails.

16. Apparatus for spreading finely divided solid material into a mold, comprising a container, means for moving the mold and container relative to each other, a stirrer in the container, the container being provided with a distributing slot, a shutter controlling the slot, a blade connected to the spreader and adapted to press metal foil in the mold, and means operable in accordance with the relative position of the container and mold for actuating the shutter.

17. Apparatus for spreading finely divided solid material into a mold, comprising a container, means for moving the mold and container relative to each other, a stirrer in the container, the container being provided with a distributing slot, a shutter controlling the slot, a blade connected to the spreader and adapted to press metal foil in the mold, means operable in accordance with the relative position of the spreader and mold for actuating the blade, and means operable in accordance with the relative position of the container and mold for actuating the shutter.

18. Apparatus for spreading finely divided solid material into a mold, comprising a container provided with a distributing slot, a mold arranged below the container, an overhead framework, and rails, the container being suspended from the overhead framework and having supporting rollers adapted to run on the rails during the spreading operation, and means for moving the mold and container relative to each other.

19. Apparatus for spreading finely divided solid material into a mold, comprising a container provided with a distributing slot, a mold arranged below the container, an overhead framework, rails, the container being suspended from the overhead framework and having supporting rollers adapted to run on the rails during the spreading operation, means for moving the mold and container relative to each other, and means for raising and lowering the rollers relative to the container in order to regulate the amount of material spread into the mold.

In testimony whereof, I have hereunto set my hand.

MEYER WILDERMAN.